United States Patent [19]

Cillario

[11] 4,293,577
[45] Oct. 6, 1981

[54] PRESERVABLE BAKED PASTRY PRODUCT, SUBSTANTIALLY FREE FROM SUCROSE AND SWEETENED WITH FRUCTOSE

[75] Inventor: Renzo Cillario, Alba, Italy

[73] Assignee: P. Ferrero & C. S.p.A., Alba, Italy

[21] Appl. No.: 163,893

[22] Filed: Jun. 27, 1980

[30] Foreign Application Priority Data

Nov. 22, 1979 [IT] Italy .............................. 69262 A/79

[51] Int. Cl.³ ............................................. A23G 3/00
[52] U.S. Cl. .................................. 426/244; 426/658; 426/804
[58] Field of Search ............... 426/244, 558, 556, 804, 426/658, 523

[56] References Cited

U.S. PATENT DOCUMENTS

| | | | |
|---|---|---|---|
| 3,492,127 | 1/1970 | Ketch et al. ......................... | 426/556 |
| 4,134,999 | 1/1979 | Muhler et al. ....................... | 426/804 |
| 4,137,336 | 1/1979 | Radlove .............................. | 426/658 |
| 4,185,127 | 1/1980 | Radlove .............................. | 426/658 |

Primary Examiner—Hiram Bernstein
Attorney, Agent, or Firm—Sughrue, Rothwell, Mion, Zinn and Macpeak

[57] ABSTRACT

Baked pastry product is obtained with the use of crystalline fructose and consists of a wheat flour-based, cellular matrix which is soft, leavened under baking conditions, and of a moisture content of 17 to 22% by weight. The starting dough is rich in water and contains 50 to 80 parts by weight of starch, 15 to 25 parts by weight of gluten, 40 to 60 parts by weight of powdered, skimmed milk and 50 to 100 parts by weight of egg solids for every 100 parts by weight of flour. A solution of crystalline fructose in water is prepared first in which the egg solids are emulsified, whereupon only addition of flour, starch, gluten and powdered milk is effected.

34 Claims, 1 Drawing Figure

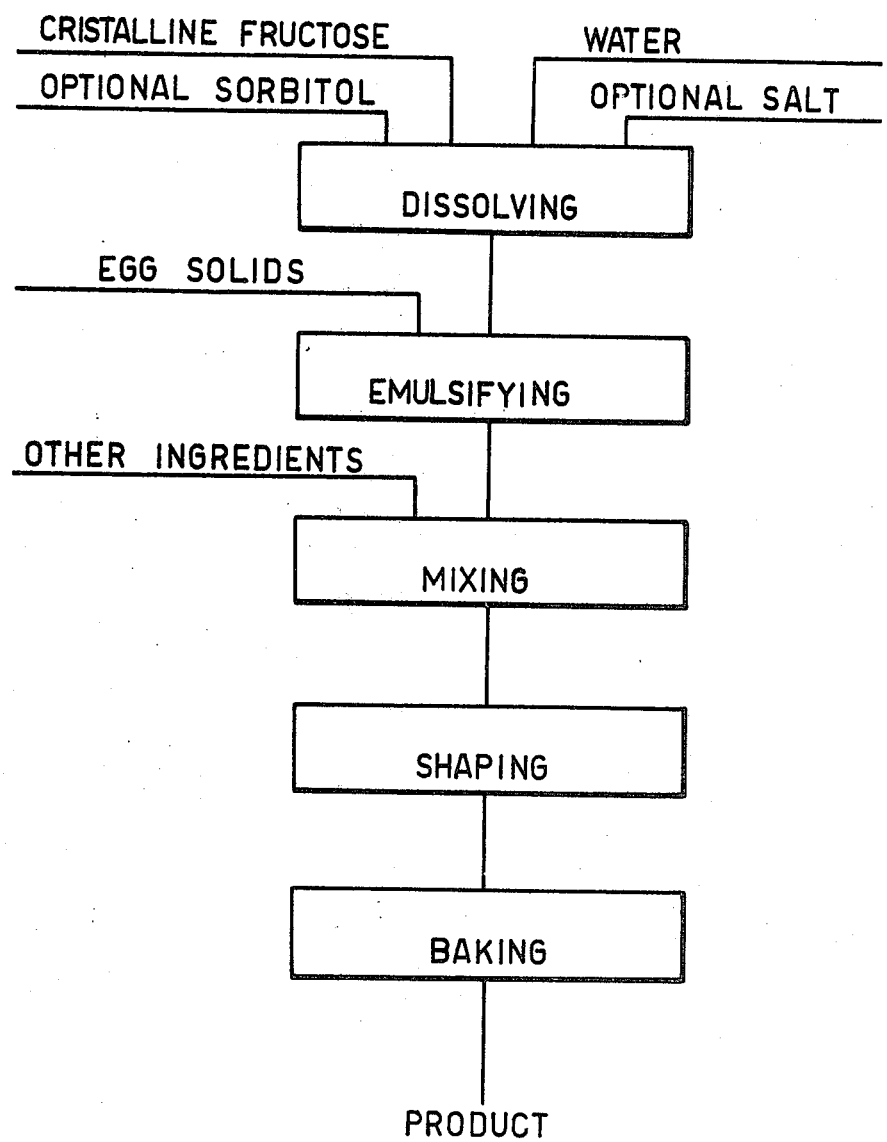

PRESERVABLE BAKED PASTRY PRODUCT, SUBSTANTIALLY FREE FROM SUCROSE AND SWEETENED WITH FRUCTOSE

The present invention relates to a baked pastry product which can be commercially preserved, and which is substantially free from sucrose and sweetened with fructose.

BACKGROUND OF THE INVENTION

Fructose is a simple sugar. The metabolism of fructose in the human body is different from that of sucrose in that it does not involve insulin, with the result that fructose is widely used as a sugar for diabetics. Moreover, as is known, fructose is capable of quickly and abundantly producing glycogen, which has a liver-protective activity; for this reason the use of fructose is also advisable in the diets of people with liver complaints and for the elderly. Yet again, the sweetening power of fructose is greater than that of sucrose, so that its use in food products instead of sucrose reduces the carbohydrate content of the food. Finally, it is known that fructose is less carciogenic than sucrose. The present tendency to replace sucrose by fructose in various food products, particularly in baked products, is therefore readily understandable.

In practice, fructose is available in two forms: that of a syrup, with a concentration of 70% by weight, and in the crystalline form. The syrup is convenient in that it is noticeably less expensive than crystalline fructose. In addition the syrup is convenient from the technological point of view, in that it is easy to store, may be metered volumetrically without difficulty for feeding to the production line, and distributes itself uniformly in the dough without giving rise to complications. However, in addition to fructose, it also contains other substances, principally glucose, the presence of which (tolerated until now) is undesirable. Crystalline fructose has the advantage of being practically pure. However, because of its hygroscopic nature, storage and metering of crystalline fructose in a food production factory are generally considered as hardly practicable. Furthermore, during the preparation and kneading of the dough, crystalline fructose readily gives rise to the formation of lumps which render the kneading difficult, and furthermore, the dough is very sticky. Lumps formation and stickiness can be reduced only by prolonged kneading but on the other hand it is known that with kneading prolonged beyond a certain limit, the quality of the dough and of the final product deteriorate. Therefore, the use of crystalline fructose in the production of baked products was rather problematic until now.

A further problem connected with the use of fructose (both in the crystalline and in the syrup form) in the production of baked products lies in the considerable browning of the product during baking at the temperatures usual for other products, generally from 230° C. to 280° C. According to the known art, the browning may be reduced by lowering the baking temperature and/or by shortening the baking time. This implies that the proportion of water in the dough must necessarily be reduced to the minimum absolutely necessary since, otherwise, the moisture content in the baked, finished product would be intolerably high. Preferably, according to the known art, turbulence ovens or high-frequency ovens should be used for baking.

Under these circumstances, the baked products made until now on a commercial scale, which are preservable and include fructose as the sweetener instead of sucrose, consist of crisp or crumbly biscuits having a moisture content of less than 5% by weight and obtained with the use of fructose syrup.

THE INVENTION

The present invention originates from the discovery that, with particular ingredients in specific proportions and with a particular method of formation of the dough, it is possible to obtain a new and advantageous baked pastry product with the use of fructose in the crystalline form.

The subject of the invention is, therefore, the said new product as such, as well as a process for its manufacture.

In particular, the invention provides a baked pastry product substantially free from sucrose and formed by a wheat flour-based cellular matrix, the said matrix being sweetened with fructose, either alone or mixed with sorbitol, wherein the said cellular matrix is soft, is not crisp, is leavened artificially and formed essentially from wheat flour and from 50 to 80 parts by weight of starch, 15 to 25 parts by weight of gluten, 40 to 60 parts by weight of skimmed milk powder and 50 to 100 parts by weight of egg solids, for every 100 parts by weight of wheat flour, the said product being obtainable by the steps of:

(a) dissolving crystalline fructose in water, if desired with the addition of sorbitol and cooking salt, and emulsifying in the obtained solution the said egg solids, in the form of powder or of fresh eggs, thereby to obtain an emulsion containing 150 to 200 parts by weight of water and at least 55 parts by weight of fructose for every 100 parts by weight of flour;

(b) introducing into the said emulsion under mixing conditions all the remaining ingredients, in the proportions specified above, and a synthetic leavening agent, to obtain a homogeneous, unleavened and substantially unkneaded dough; and (c) baking the said dough until a final product having a moisture content of 17 to 22% by weight is obtained.

Preferably the said moisture content is 18 to 20% by weight. With contents greater than 22% by weight the product is difficult to preserve.

A novel aspect of the invention lies in the use of a high quantity of water in the dough. Preferably the proportion of water in the emulsion mentioned above is 160 to 180, and even more advantageously about 170 parts by weight for every 100 parts by weight (p/w) of flour. The preliminary formation of the said emulsion is a further novel aspect of the present invention in that it allows to safely avoid the formation of the lumps, mentioned above, in the dough. Yet a further important aspect of the invention, in combination with the former ones, lies in the fact that the dough is formed only by mixing necessary to achieve homogeneity, without further kneading or mechanical stressing of the dough. As a result, a dough is obtained which is light, extremely soft and plastic, and is not leavened.

The quantity of crystalline fructose may even amount to 200 p/w for every 100 p/w of flour. However 120 to 160 p/w are preferred and still more preferably 140 to 150 p/w.

If desired, sorbitol may be used in addition to fructose. Sorbitol is commercially available in crystalline form and in the form of a syrup. For the purposes of the present invention a syrup having a concentration of 70% by weight is suitable. The water content of this syrup must be taken into account in calculating the water content of the emulsion. Up to 3 p/w of sorbitol for every 1 p/w of fructose may be used. However, because of the laxative action of sorbitol, it is preferable that its quantity does not exceed that of the fructose. In practice, when using a 70% syrup, 1 part by weight of syrup for 1.2 to 1.6 p/w (preferably 1.4 p/w) of fructose is recommended.

If the recipe for the product includes cooking salt, the salt is dissolved in the water prior to, during or after the addition of the fructose or sorbitol.

The egg solids mentioned above may be in the form of powdered whole eggs and/or in the form of fresh eggs. When fresh eggs are used it is necessary to take account of their water content in the calculation of the total water content of the emulsion. The preferred quantity of egg solids is 65 to 75 p/w for every 100 p/w of flour. It is also preferable for the egg solids to contain excess egg yolk solids compared to the natural proportion. In particular, it is preferred to use a mixture consisting of 75 to 55% by weight of powdered whole egg and, correspondingly, 25 to 45% by weight of powdered egg yolk.

Preferably, the proportion of starch is 60 to 70 p/w, the proportion of gluten is about 20 p/w and the proportion of powdered milk is 50 to 55 p/w, for every 100 p/w of flour. These proportions are particularly advantageous for the purpose of giving stability to the finished product over several months.

Among other useful ingredients should be mentioned, in particular, edible fats and monoglycerides. As fats, the usual animal or vegetable fats and oils used until now in baked pastries may be employed. Vegetable fats and oils such as ground nut oil, maize oil, and coconut oil or fat are particularly suitable. The total proportion of the fats and/or oils may vary between 10 p/w and 40 p/w (for 100 p/w of flour), but the preferred proportion is 15 to 25 p/w.

Monoglycerides are useful for preserving the freshness of the product (according to concepts known per se), particularly in view of the considerable starch content of the dough). In general, for every 100 p/w of flour from 5 to 20 p/w, preferably 10 to 15 p/w, of monoglycerides may be used.

If desired, the dough may also contain other minor ingredients such as fillers, binders, diluents and/or non-digestable substances such as cellulose and its derivatives, as well as flavouring substances, vitamins, minerals and emulsifying agents.

According to the invention, the leavening of the dough, that is the production of the cellular matrix of the product, occurs during baking. Therefore, the leaveners used in the process are those typical of baked pastries. Particularly suitable are the carbonate or bicarbonate of sodium or ammonium and also the usual baking powder, which enable a soft product to be obtained. It is convenient to use a mixture of ammonium carbonate and baking powder, particularly in proportions of 1 to 5% by weight and 5 to 12% by weight, respectively, referred to the flour.

Doughs which are particularly suitable for the purposes of the present invention have the following composition by weight:

| | |
|---|---|
| Crystalline fructose | 10–15% |
| Sorbitol (70% syrup) | 5–10% |
| Wheat Flour | 12–18% |
| Gluten | 2.5–3.5% |
| Powdered starch | 9–11% |
| Powdered egg | 10–14% |
| Powdered skimmed milk | 7–9% |
| Vegetable oil | 2.5–3.5% |
| Monoglycerides | 0.15–0.25% |
| Ammonium carbonate | 0.4–0.5% |
| Baking powder | 1.2–1.5% |
| Water + salt + Flavoring agents | 23–26% |

The attached drawing is a schematic diagram of the process according to the invention.

DETAILED DESCRIPTION

The dissolution of the crystalline fructose, with the optional addition of sorbitol syrup and salt, is preferably carried out in warm or hot water, preferably at 30° to 35° C. In every case, the temperature of the solution which is passed to the emulsifying stage must be less than that at which egg albumen coagulates, that is less than about 50° C.; preferably this temperature is still 30° to 35° C. Typically, the egg solids (in powder form or in the form of fresh eggs) are added to the fructose solution which is kept under agitation in any suitable emulsifier and the emulsifying is continued until a fine, homogeneous emulsion is obtained. In general, about 10 minutes are sufficient.

The emulsion is transferred to a mixer, preferably of the planetary type, for mixing with the remaining ingredients. The order of addition of the ingredients to the mixer is the logical one and substantially usual. Thus, it is recommendable to start with the addition of the monoglycerides and the fats or oils, and then to proceed with the addition of the flour, the starch, the powdered milk, the gluten, etc. The mixing is carried out for a time which, advantageously, is solely that necessary to obtain a homogeneous, substantially unkneaded dough. In general, 20 to 25 minutes are sufficient, with a maximum mixing time of 30 minutes. The final dough is practically unleavened and is not subjected to leavening (or any further mechanical working) before baking. As distinct from "tough" doughs, the obtained dough is extremely soft, although not flowing like a batter.

For baking, the obtained dough may be shaped into various forms. Flat, relatively thin forms are preferred to facilitate evaporation of the excess water, particularly of a thickness of from about 2.5 mm to about 5 mm. In a preferred embodiment, the dough may be rolled into a continuous layer of indefinite length and convenient thickness, and this layer may be baked continuously on a conveyor belt in a tunnel oven.

During baking, the thickness of the layer of dough increases due to the gas bubbles produced by the leavening agent. Preferably this increase in thickness is about twice and not more than three times the initial thickness; the quantity of leavening agent should therefore be selected correspondingly. For example, in a typical embodiment, layers of baked, cellular product having thicknesses of 6 to 10 mm, on average 8 mm, are obtained from layers of dough having a thickness of 2.5 to 5 mm, as indicated above. With a conventional oven (whether a tunnel oven or otherwise), the temperature in the baking chamber must be relatively low to avoid excess browning. Suitable temperatures are within the range of 160° to 220° C., preferably 180° to 200° C. The baking time should also be as short as possible, preferably not longer than 10 minutes. The type of oven preferred is a turbulence oven, in which the baking time may vary between about 5 and 9 minutes, on average about 6 to 7 minutes. A further type of oven which can be recommended is that operating by direct dielectric heating of the dough layer, typically at a frequency of 27 Megahertz. This type of oven may be used to carry out all the baking or to complete a preliminary baking carried out in a hot chamber oven. In every case, what matters is to obtain a final baked product having a moisture content as specified above (17 to 22%, preferably 18 to 20%, by weight), determined by drying a sample at 105° C. until constant weight. According to an advantageous aspect of the invention, the baking may be carried out in a hot chamber (in particular in a turbulence oven) with simultaneous dielectric heating (by means of electrodes disposed in the turbulence oven), so that the temperature in the oven and the baking time may be reduced to a minimum with resultant minimum browning of the product. It is also advantageous, according to a further characteristic of the invention, to cover the layer of dough to be baked with a thin blanket of a dried, ground, ordinary biscuit, for example in a ratio of 80 to 140 g/m$^2$, preferably 100 to 115 g/m$^2$.

The layer of final baked product may be cut into pieces of a desired form and size, for consumption as such or for use in the production of pocket-size cakes or family-size cakes comprising several layers, including suitable intermediate filling layers and optionally enrobed with molten chocolate. The product, is, in any case preservable as such for several months in sealed packages, preferably at temperatures less than 18° C.

EXAMPLE

The following ingredients in the proportions by weight indicated are used:

| Crystalline fructose | 13.4% |
|---|---|
| Sorbitol (70% syrup) | 9.0% |
| Salt | 0.09% |
| Powdered whole egg | 7.6% |
| Powdered egg yolk | 3.2% |
| Ground nut oil | 2.9% |
| Wheat Flour | 15.3% |
| Gluten | 2.9% |
| Powdered wheat starch | 9.93% |
| Powdered skimmed milk | 7.9% |
| Monoglycerides | 0.19% |
| Vanilla | 0.09% |
| Amonium carbonate | 0.4% |
| Baking powder | 1.3% |
| Water | 25.8% |
| | 100.0% |

The crystalline fructose, the sorbitol syrup and the salt are dissolved in water at 30° to 35° C. The solution is transferred to an emulsifier, the powdered whole egg and egg yolk are added and the mixture is emulsified for 10 minutes at 30° to 35° C., a fine, homogeneous emulsion being obtained. The emulsion is transferred to a mixer of the planetary type (main shaft 30 revolutions per minute, planet shaft 75 revolutions per minute) and the remaining ingredients that is, the monoglycerides, the ground nut oil, the wheat flour, the starch, the powdered milk, the gluten, the ammonium carbonate, vanilla and the baking powder, are added, mixing being continued for about 25 minutes. The obtained dough is deposited on a baking conveyor belt in the form of a layer 3 to 3.5 mm thick, and is overspread with about 110 g/m$^2$ of dried, ground biscuit. The baking is carried out in a tunnel oven with dielectric heating (27 Megahertz; "Strayfield" type; peak voltage between the electrodes 10 kV; maximum power 40 kW) with a rate of travel such that the baked product leaving the oven has a moisture content of 18 to 19% by weight. The product is soft (more or less like the well known "Pain de Genes"), is slightly browned to a perfectly acceptable degree and has a thickness of about 8 mm. Pieces of the product (for example rectangles having a size of 3.5×7 cm) are perfectly preservable for at least three months in sealed envelopes of plastics foil, even at ambient temperature, and may be used as dietetic food products. Further similar pieces were impregnated with an alcoholic liqueur (containing 10% by weight of ethyl alcohol), enrobed with molten chocolate and enclosed in hermetically sealed envelopes; these products too are preservable for at least three months, without becoming either mouldy or mushy.

I claim:

1. Baked pastry product substantially free from sucrose and formed by a wheat flour-based cellular matrix, the said matrix being sweetened with fructose, either alone or in association with sorbitol, wherein the said cellular matrix is soft, is not crisp, is artificially leavened and is formed essentially, in addition to the wheat flour, from 50 to 80 parts by weight of starch, 15 to 25 parts by weight of gluten, 40 to 60 parts by weight of powdered skimmed milk and 50 to 100 parts by weight of egg solids for every 100 parts by weight of wheat flour, the said product being obtainable by the steps of:

(a) dissolving crystalline fructose in water and emulsifying in the obtained solution the said egg solids, in the form of powder or fresh eggs, thereby to obtain an emulsion containing from 150 to 200 parts by weight of water and at least 55 parts by weight of fructose for every 100 parts by weight of flour;

(b) introducing all the remaining ingredients in the proportions specified above, and a synthetic leavening agent, into the said emulsion under mixing conditions, to obtain a homogeneous, unleavened dough which is substantially unkneaded; and (c) baking the said dough in an oven to obtain a final product having a moisture content of 17 to 22% by weight.

2. Product according to claim 1, wherein the said proportion of water in the emulsion is 160 to 180 parts by weight.

3. Product according to claim 1, wherein the proportion of starch is 60 to 70 parts by weight and the proportion of gluten is about 20 parts by weight.

4. Product according to claim 1, wherein the proportion of powdered skimmed milk is 50 to 55 parts by weight.

5. Product according to claim 1, wherein the proportion of egg solids is 60 to 75 parts by weight.

6. Product according to claim 1, wherein the proportion of fructose is 120 to 160 parts by weight.

7. Product according to claim 1, wherein the ingredients used in stage (b) also include at least one edible fat or oil, the total proportion of fats and oils being 10 to 40 parts by weight, for every 100 parts by weight of flour.

8. Product according to claim 1, in which 5 to 20, parts by weight of food-grade monoglycerides for every 100 parts by weight of flour are also added in stage (c).

9. Product according to claim 1, wherein also sorbitol is used in step a in the form of a 70% syrup in a proportion of 1 part by weight for every 1.2 to 1.6 parts by weight of fructose.

10. Product according to claim 1, in which the egg solids used consist of powdered whole eggs.

11. Product according to claim 1, in which the egg solids used consist of 75 to 55% by weight of powdered whole eggs and, correspondingly, 25 to 45% by weight of powdered egg yolks.

12. Product according to claim 1, in which the temperature of the oven is 160° to 220° C.

13. Product according to claim 1, in which the baking is carried out or completed by means of dielectric heating at high frequency.

14. Product according to claim 1, wherein the dough prior to baking has the following composition by weight: 10 to 15% fructose, 5 to 10% sorbitol (70% syrup), 12 to 18% wheat flour, 2.5 to 3.5% gluten, 9 to 11% powdered starch, 10 to 14% powdered egg, 7 to 9% powdered skimmed milk, 2.5 to 3.5% vegetable oil, 0.15 to 0.25% monoglycerides, 0.4 to 0.5% ammonium carbonate, 1.2 to 1.5% baking powder, 23 to 26% water, plus salt and flavouring agent.

15. Product according to claim 1 or 14, wherein the dough is baked in the form of a thin layer, having an initial thickness not greater than 5 mm.

16. Product according to claim 15, in which the layer to be baked is overspread with dried, ground biscuit, in a ratio of 80 to 140 g/m².

17. Product according to claim 9, wherein said proportion is 1 part by weight for every 1.4 parts by weight of fructose.

18. Process for the production of a baked pastry product substantially free from sucrose and formed by a wheat flour-based cellular matrix, the said matrix being sweetened with fructose, wherein for the formation of the dough for the product there are used essentially, in addition to wheat flour, 50 to 80 parts by weight of starch, 15 to 25 parts by weight of gluten, 40 to 60 parts by weight of powdered skimmed milk and 50 to 100 parts by weight of egg solids for every 100 parts by weight of flour, and a synthetic leavening agent, and further wherein the process comprises the steps of:

(a) dissolving crystalline fructose in water and emulsifying in the obtained solution the said egg solids in the form of powder or fresh eggs, thereby to obtain an emulsion containing 150 to 200 parts by weight of water and at least 55 parts by weight of fructose for every 100 parts by weight of flour;

(b) introducing all the remaining ingredients in the proportions specified above, and the synthetic leavening agent, into the said emulsion under mixing conditions, to obtain a homogeneous, unleavened dough which is substantially unkneaded; and (c) baking the said dough in an oven to obtain a final product having a moisture content of 17 to 22% by weight.

19. Process according to claim 18, wherein the said proportion of water in the emulsion is 160 to 180 parts by weight.

20. Process according to claim 18, wherein the proportion of starch is 60 to 70 parts by weight and the proportion of gluten is about 20 parts by weight.

21. Process according to claim 18, wherein the proportion of powdered skimmed milk is 50 to 55 parts by weight.

22. Process according to claim 18, wherein the proportion of egg solids is 60 to 75 parts by weight.

23. Process according to claim 18, wherein the proportion of fructose is 120 to 160 parts by weight.

24. Process according to claim 18, wherein the ingredients used in stage (b) also include at least one edible fat or oil, the total proportion of the fats and oils being 10 to 40 parts by weight for every 100 parts by weight of flour.

25. Process according to claim 18, in which, in stage (b), monoglycerides are also added in a quantity of 5 to 20 parts by weight for every 100 parts by weight of flour.

26. Process according to claim 18, wherein also sorbitol is used in step (a) in the form of a 70% syrup in a proportion of 1 part by weight for every 1.2 to 1.6 parts by weight of the fructose.

27. Process according to claim 18, in which the egg solids used consist of powdered whole egg.

28. Process according to claim 18, in which the egg solids used consist of 75 to 55% by weight of powdered whole egg and, correspondingly, 25 to 45% by weight of powdered egg yolk.

29. Process according to claim 18, in which the temperature of the oven is 160° to 220° C.

30. Process according to claim 18, in which the baking is carried out or completed by means of dielectric heating at high frequency.

31. Process according to claim 18, wherein dough prior to baking has the following composition by weight: 10 to 15% fructose, 5 to 10% sorbitol (70% syrup), 12 to 18% wheat flour, 2.5 to 3.5% gluten, 9 to 11% powdered starch, 10 to 14% powdered egg, 7 to 9% powdered skimmed milk, 2.5 to 3.5% vegetable oil, 015 to 0.25% monoglycerides, 0.4 to 0.5% ammonium carbonate, 1.2 to 1.5% baking powder, 23 to 26% water, plus salt and flavouring agent.

32. Process according to claim 18 or 31, wherein the dough is baked in the form of a thin layer, having an initial thickness not greater than 5 mm.

33. Process according to claim 32, in which the layer to be baked is overspread with dried, ground biscuit, in a ratio of 80 to 140 g/m².

34. Process according to claim 26, wherein said proportion is 1 part by weight for every 1.4 parts by weight of fructose.

* * * * *

UNITED STATES PATENT AND TRADEMARK OFFICE
CERTIFICATE OF CORRECTION

PATENT NO. : 4,293,577
DATED : October 6, 1981
INVENTOR(S) : Renzo Cillario

It is certified that error appears in the above—identified patent and that said Letters Patent is hereby corrected as shown below:

Claim 31, column 8, line 47, "015 to 0.25%" should be
--0.15 to 0.25%--

Signed and Sealed this

Thirtieth Day of March 1982

|SEAL|

Attest:

GERALD J. MOSSINGHOFF

Attesting Officer     Commissioner of Patents and Trademarks